United States Patent [19]

Abe et al.

[11] 4,016,406

[45] Apr. 5, 1977

[54] AUTOMATIC FILM RETRIEVAL SYSTEM AND METHOD THEREFOR

[75] Inventors: Eiji Abe; Takahisa Ohta; Mitsuharu Urata, all of Ise, Japan

[73] Assignees: Shinko Electric Co., Ltd., Tokyo, Japan; Fuji Photo Film Co., Ltd., Minami-ashigara, Japan

[22] Filed: Mar. 19, 1975

[21] Appl. No.: 560,000

Related U.S. Application Data

[63] Continuation-in-part of Ser. No. 376,267, July 3, 1973, abandoned.

[30] Foreign Application Priority Data

July 3, 1972 Japan .................. 47-66464

[52] U.S. Cl. ................ 235/92 MP; 235/92 CA; 235/92 R; 353/26 A
[51] Int. Cl.² .................. G03B 23/12; G06M 3/14
[58] Field of Search ..... 235/92 MP, 92 CA, 92 CT, 235/151.11; 353/26 R, 26 A; 318/603

[56] References Cited

UNITED STATES PATENTS

| 3,612,976 | 10/1971 | Tripp .................. 235/151.11 |
| 3,708,677 | 1/1973 | Volk et al. .................. 353/26 A |
| 3,731,177 | 5/1973 | Commander et al. .......... 318/603 |
| 3,852,719 | 12/1974 | Hideo Nishumura et al. ...... 235/92 MP |

Primary Examiner—Joseph M. Thesz
Attorney, Agent, or Firm—Sughrue, Rothwell, Mion, Zinn & Macpeak

[57] ABSTRACT

A first counter stores the number of a desired microfilm frame to be located at an access position. A second counter stores the number of the present frame at the access position. The microfilm is normally driven at a high speed, but it is desired to drive the microfilm at a lower speed for a predetermined number of frames prior to the arrival of the desired frame at the access position. This predetermined number is set into a compensating circuit. A comparator first determines the magnitude and sense of the difference between the two counters while the film is stationary. The predetermined number is then added to the contents of the second counter, and the film is driven until the comparator detects a first equality of the contents of the first and second counter, thereby switching the film drive to the lower speed. The predetermined number is then algebraically added to the contents of the second counter in the opposite sense, so that, when the desired frame reaches the access position, the comparator detects a second equality of the contents of the first and second counter, thereby stopping the film drive.

3 Claims, 6 Drawing Figures

AUTOMATIC FILM RETRIEVAL SYSTEM AND METHOD THEREFOR

CROSS REFERENCE TO RELATED APPLICATION

This application is a continuation-in-part of application Ser. No. 376,267, filed July 3, 1973 now abandoned.

BACKGROUND OF THE INVENTION

1. Field of the Invention

This invention relates to a system and method for the retrieval or accessing of a desired frame from a plurality of frames carried on a roll film on which various information is recorded.

2. Description of the Prior Art

In conventional methods for retrieving film frames, e.g., from microfilm would on a reel, a driving motor's direction of rotation is controlled by the output of a comparator which compares the output of a counter counting the number of frames of the film or reading the frame number of the film with the output of another counter storing the number of the desired frame of the film. Further, in the conventional method, the film feeding speed is reduced when the difference between both outputs reaches a predetermined value close to zero; and when both outputs become equal, the film is stopped to position the desired frame of the film at the projection or viewing station.

In conventional devices for carying out the above-described conventional procedures, complicated circuitry including an operation circuit computing the difference between two decimal counters and a speed control circuit has been necessary, and a considerable improvement in price and circuit construction has been desired.

SUMMARY OF THE INVENTION

In light of the above defects inherent in conventional systems, the primary object of the present invention is to provide an improved system and method for the retrieval of a desired frame of a roll film which is of simple construction and of low cost.

Another object of the present invention is to provide a film frame retrieval system and method wherein simple circuitry is used and which is, accordingly, relatively problem free and easy to maintain.

Another specific object of the present invention is to provide a film frame retrieval system and method wherein the desired frame number of the microfilm is memorized by a first counter and the frame number of the frame at the projection or viewing position is read by a second counter, and the outputs of the first and second counters are detected to provide a positive or negative feed direction signal, and a number corresponding to the number of frames through which the film must be run slowly for protection is added to or subtracted from the detected difference between these two outputs to automatically control the timing of the start of the slow feed of the film.

The above objects of the invention are accomplished by providing simple circuitry including a first and a second counter, a comparator, a coincidence detecting circuit, means for adding or subtracting a predetermined number corresponding to the number of slow feed frames required, and means for controlling the speed of the film according to the outputs of the counters and the detecting means.

The most important feature of the film retrieval system and method in accordance with the present invention is that a predetermined number corresponding to the number of slow feed frames is added to or subtracted from the output of the second counter which reads the frame number at the access position, and by the addition or subtraction the outputs of the first and second counters are compared to control the speed of the film. After the above amendment (addition or subtraction) of the output of the second counter, the output is further amended back to the original output and the film is stopped by the coincidence of the output of the first counter and the re-amended output of the second counter.

Other objects, features and advantages of the present invention will be made apparent from the following detailed description of the preferred embodiment thereof taken in conjunction with the accompanying drawing.

DETAILED DESCRIPTION OF THE INVENTION

Figure 1:
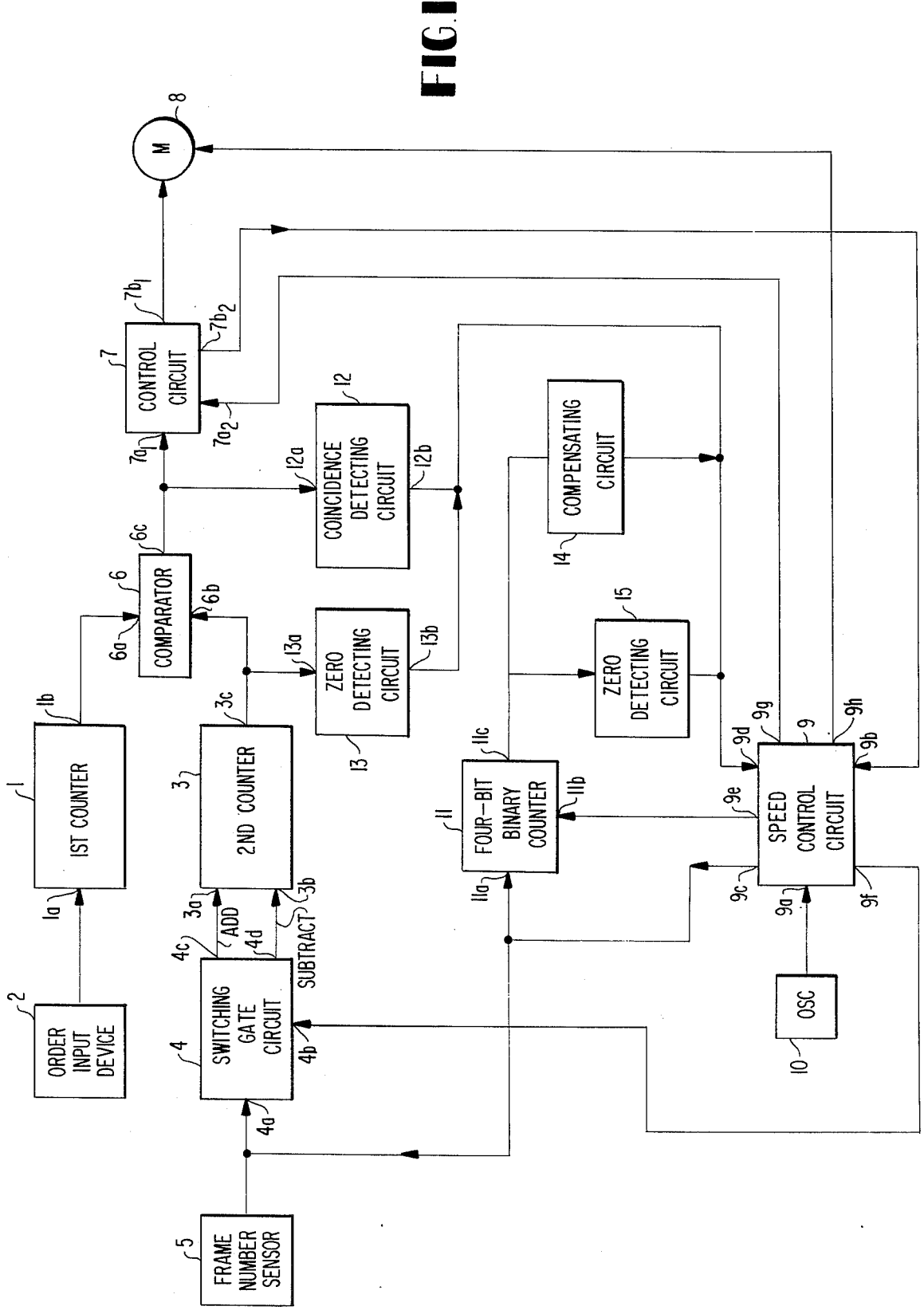
FIG. 1 is a simplified block diagram of an electric circuit embodying the present invention.

In FIG. 1, reference numeral 1 indicates a first counter which memorizes an order put in the input terminal 1a thereof and puts out the memorized order at the output terminal 1b thereof. Reference numeral 2 indicates an order input device which supplies an order corresponding to the frame number desired of the microfilm to be retrieved to the input terminal 1a of the first counter 1. Reference numeral 3 indicates a second counter which counts the number of the frame at the access position. The second counter 3 is provided with an addition terminal 3a and a subtraction terminal 3b for making an addition or subtraction therein and puts out the counted number of the frame at the output terminal 3c thereof incremented or decremented by the addition or subtraction input provided at the input terminals 3a or 3b.

The reference numeral 4 indicates an addition-subtraction switching gate circuit which transmits the order put in at the input terminal 4a thereof to either the output terminal 4c or 4d according to the control signal provided at the control input terminal 4b thereof. The output terminals 4c and 4d are connected with the input terminals 3a and 3b of the second counter 3, respectively. Reference numeral 5 shows a microfilm frame number reading sensor which supplies pulse signals to the control input terminal 4a of the addition-subtraction switching gate circuit 4 every time a frame of the microfilm is fed.

Numeral 6 designates a comparator which provides output signals calling for either forward rotation or reverse rotation of the microfilm reels according to the input signals put in at the input terminals 6a and 6b thereof. That is, when the input signal supplied at the input terminal 6a, and representing the memorized desired frame number put into the first counter 1, is larger than that supplied at the other input terminal 6b, and representing the counted number of the frame of the microfilm at the projection or access position as modified by the addition or subtraction signal provided at the input terminal 3a or 3b of the second counter 3, the comparator 6 provides a forward rotation signal at the output terminal 6c thereof. Reference numeral 7 indicates a forward-reverse control circuit, the input terminal $7a_1$ of which is connected with the output terminal 6c of the comparator 6. The output of the forward-reverse control circuit 7 from the output terminal $7b_1$ thereof controls a motor 8. The output signal from the output terminal $7b_2$ of the forward-reverse control circuit 7 is introduced to the control input terminal 4b of said addition-subtraction switching gate circuit 4 via the terminal 9f of speed control circuit 9.

Reference numeral 9 indicates a speed control circuit which transmits pulse signals received at the input terminal 9a thereof to the output terminal 9c according to the order put in at the start signal input terminal 9b from the output terminal $7b_2$ of the forward-reverse control circuit 7 and controls the speed according to the order put in at the control input terminal 9d thereof. Reference numeral 9e indicates a control order supply terminal which supplies a control order according to an order put in at the control input terminal 9d. The output terminal 9c is connected with the input terminal 4a of the addition-subtraction switching gate circuit 4. A forward-reverse control signal from the output terminal $7b_2$ of the forward-reverse control circuit 7 is introduced to the start signal input terminal 9b. The reference numeral 10 indicates an oscillator which supplies pulse signals to the input terminal 9a of the speed control operation circuit 9.

Reference numeral 11 indicates a four-bit binary counter which has an input terminal 11a to which the output signal from the speed control operation circuit 9 is supplied for counting and has a control input terminal 11b to which a control order is supplied for controlling the number of pulses to be supplied out of the output terminal 11c thereof.

Reference numeral 12 indicates a coincidence detecting circuit to the input terminal 12a of which is provided an output signal from the comparator 6 and from the output terminal 12b of which is supplied an output order only when the counted numbers of said first and second counters 1 and 3 become coincident. The output order from the output terminal 12b is introduced to the control input terminal 9d of the speed control operation circuit 9.

Reference numeral 13 indicates a zero detecting circuit which supplies a control order to the control input terminal 9d of the speed control operation circuit 9 from the output terminal 13b thereof when the input supplied from the counter 3 to the input terminal 13a thereof becomes zero.

Reference numeral 14 indicates a compensating circuit which supplies a control order to the control input terminal 9d of the speed control operation circuit 9 when the four-bit binary counter 11 receives an input signal of a predetermined value from the output terminal 9c of the speed control operation circuit 9, that is, the number α of slow speed frames required to stop the film when it is moving at the high speed.

Reference numeral 15 indicates a zero detecting circuit which supplies a control order to the control input terminal 9d when the four-bit binary counter 11 reads out zero.

Figure 4:
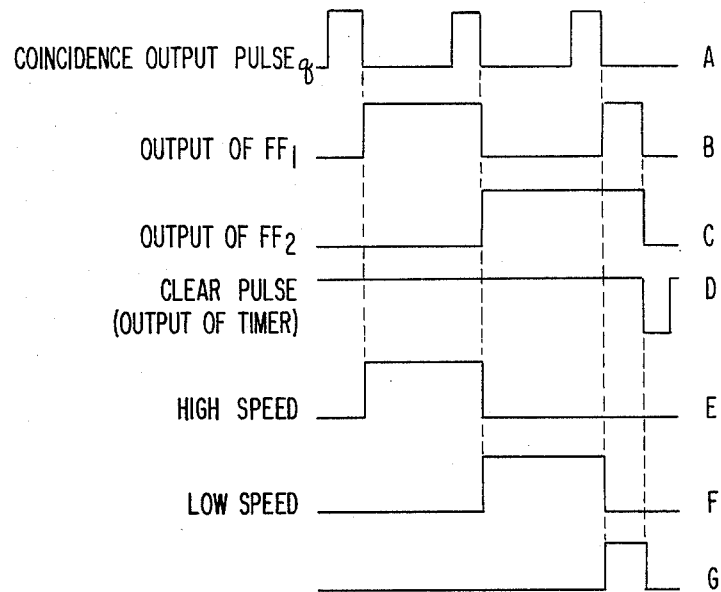
FIG. 4 shows waveforms explaining the operation of FIG. 3.
Figure 2:
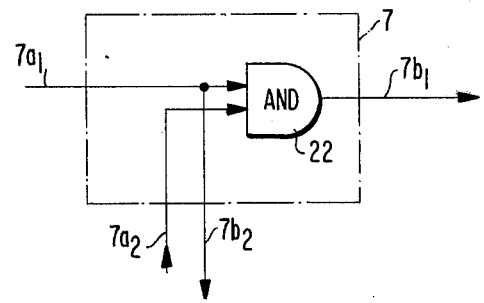
FIG. 2 is a schematic diagram of the control circuit 7 shown in FIG. 1.
Figure 3:
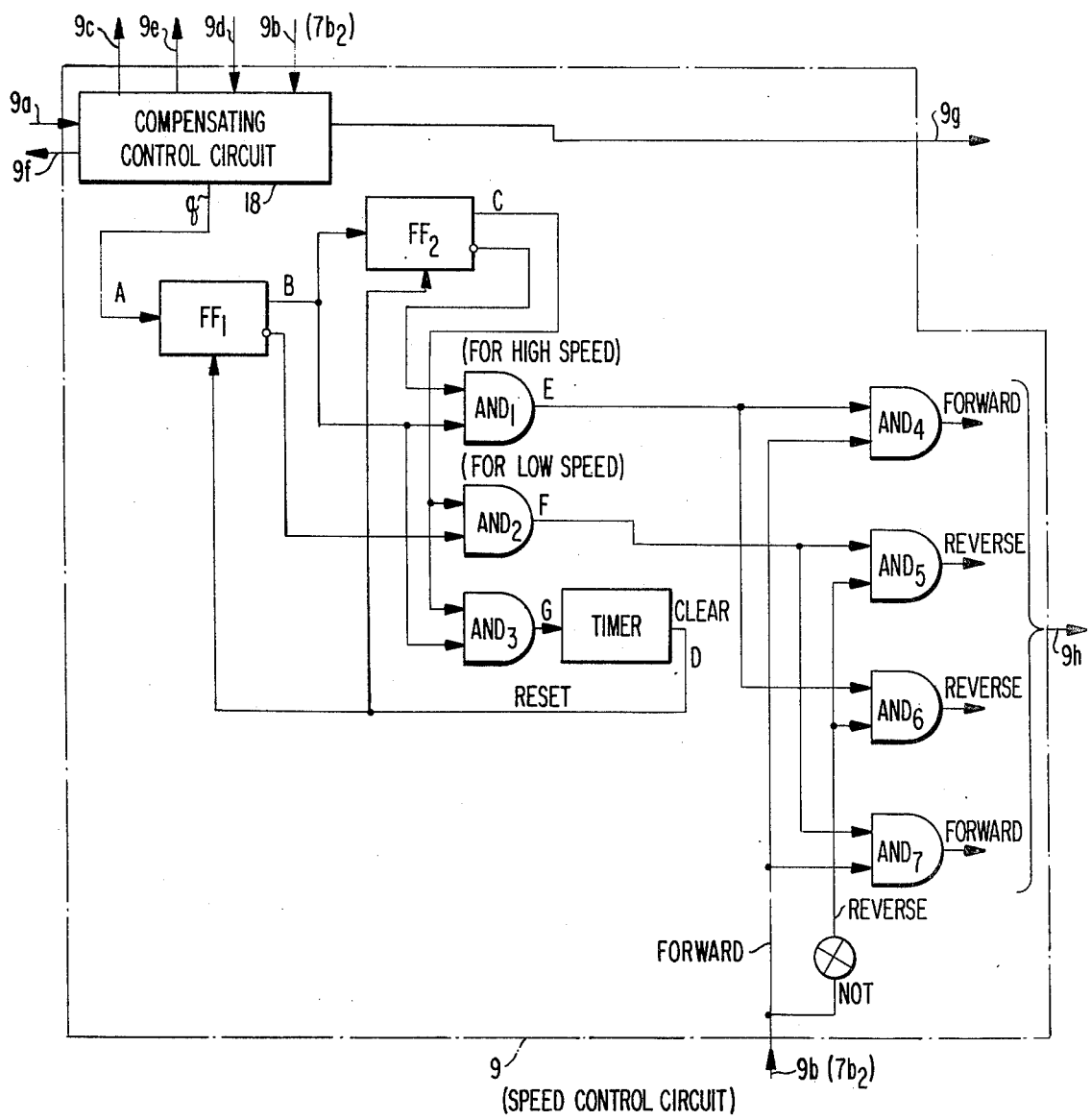
FIG. 3 is a schematic diagram of the speed control circuit 9 shown in FIG. 1.
Figure 5:
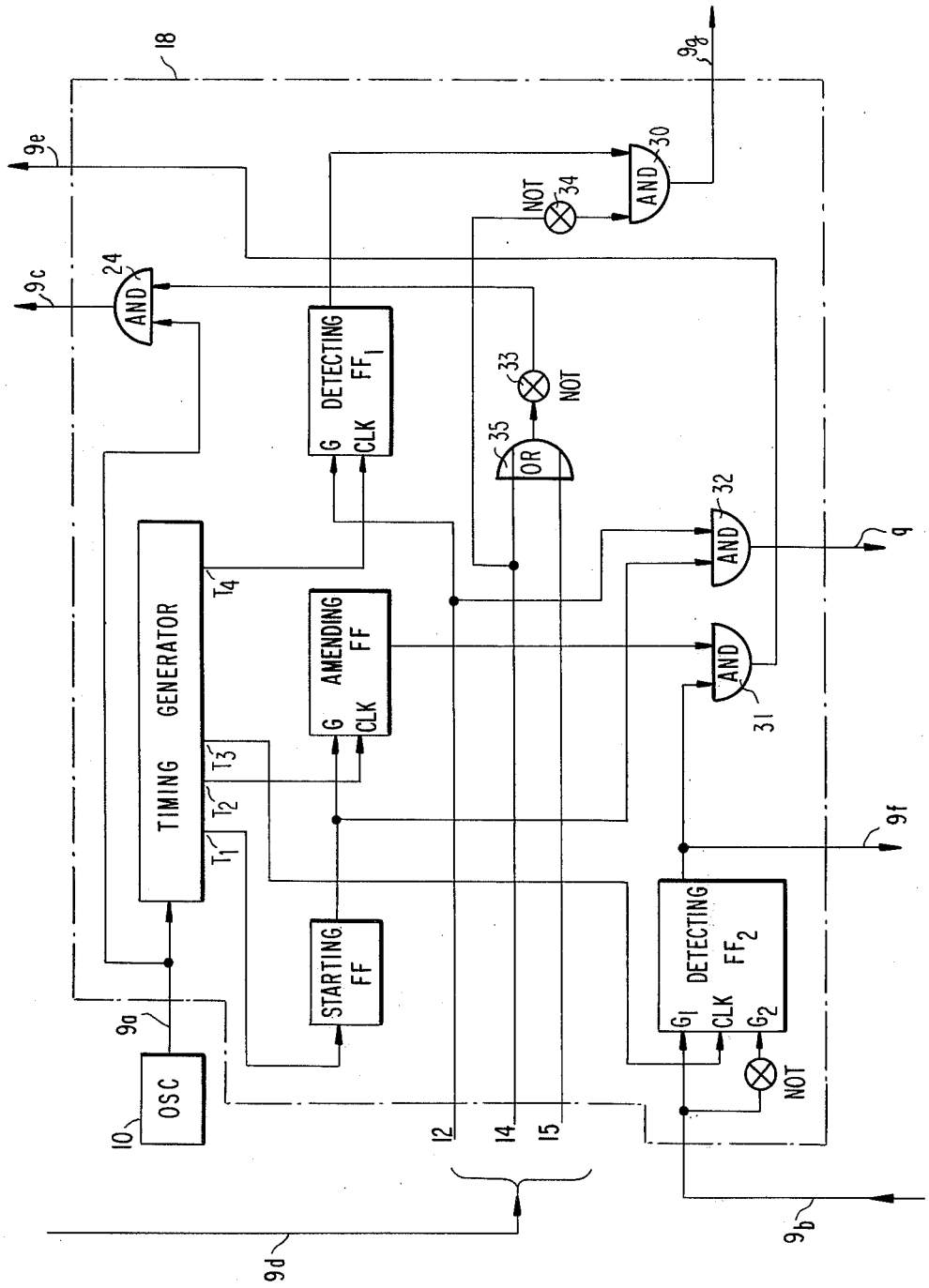
FIG. 5 shows in more detail portions of block 18 of FIG. 3.
Figure 6:
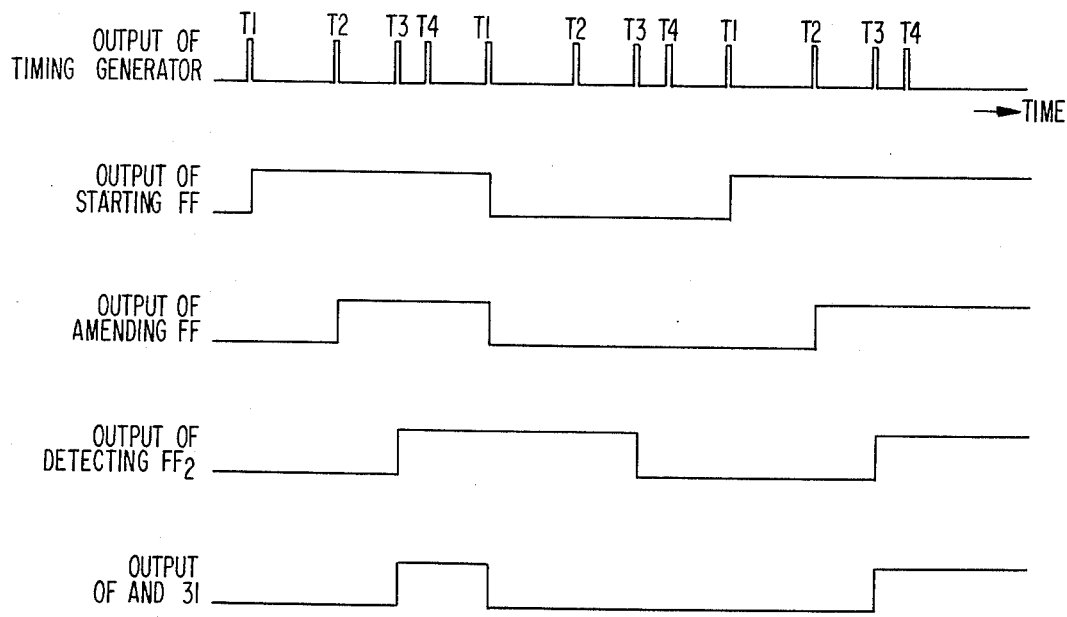
FIG. 6 shows waveforms explaining the operation of FIG. 3.

FIG. 2 shows a schematic circuit diagram of control circuit 7, and FIGS. 3, 5 and 6 show details of the speed control circuit 9. FIG. 4 shows waveforms A to G of signals appearing at various points of FIG. 3. The operation of the system of FIG. 1 will be described with reference to FIGS. 2–6.

In operation, in the construction as described hereinabove, when the slow feed frame number α is set (the manufacturer or serviceman can set the slow feed frame number; the best slow feed frame number is decided by the type of film which is used), for instance, as 15 in the compensating circuit 14, and assuming that 100 is now read by the second counter 3 and that 130 is memorized as the desired frame number by the first counter 1 as put in by the order input device 2, then a forward rotation order signal is supplied from the output terminal 6c of the comparator 6 upon start of driving of the comparator 6. Further, a control order according to the forward rotation is supplied to the addition-subtraction switching gate circuit 4 from terminal $7b_2$ of the forward-reverse control circuit 7 via terminals 9b and 9f of speed control circuit 9 to allow the input signal of the addition-subtraction switching gate 4 to be supplied to the output terminal 4c thereof (addition terminal). Thereafter, by the start of the speed control operation circuit 9 pulse signals from the oscillator 10 are transmitted to the second counter 3 to increase the counter number thereof by way of the speed control operation circuit 9 and the addition-subtraction switching gate circuit 4, and at the same time to increase the counter number counted by the four-bit binary counter 11. As the first counter 1 is at 130 and the second counter 3 is at 100, the counted number of the pulse signals is increased until the counted number in the four-bit binary counter 11 becomes the same as the number of slow feed frames α (in this case, 15).

In the above process, at the time when the compensating circuit 14 reads out the slow feed number 15 (at the time the counted number of the four-bit binary counter 11 becomes 15, a signal goes from the binary counter terminal 11c to the circuit 14), a control order is supplied from the compensating circuit 14 to input 9d, and the order from the output terminal 9c ceases, so that the counted number of the second counter 3 stops at 115 with 15 counted by the four-bit binary counter 11. The pulse signal thus continues from the terminal 9c until the counted number of the four-bit binary counter 11 becomes 15.

Subsequent to the above process, the counted number of the counter 3 is increased according to the pulse signal sent from the reading sensor 5 as the microfilm advances so as to feed the film at a high speed, that is, a pulse signal of the frame is added to the input terminal 3a of the second counter 3 through the output terminal 4c of the circuit 4 from the reading sensor 5, and the counted number of the second counter 3 is increased. Thus, when the counted numbers of the both counters 1 and 3 become coincident with each other (at 130 in this case), a control order signal is supplied via 11b to the four-bit binary counter 11 from the coincidence detecting circuit 12 through terminals 9d and 9e of the speed control operation circuit 9 so that the counted number α in the binary counter 11 effects subtraction on the counter 3 (the slow feed frame number α=15 is subtracted from the second counter 3) and the film is fed at a slow speed until an order is supplied from the zero detecting circuit 15. When the counted numbers of the counters 1 and 3 again become coincident with each other, the microfilm stops at the desired position due to the order signal from the coincidence detecting circuit 12. The zero detecting circuit 13 acts at the time the counted number of the second counter 3 is larger than that of the first counter 1 and the counted number of the second counter 3 is less than 15, and acts lest the second counter 3 should be zero.

If the number to be detected which is put into the first counter 1 is changed to 140 from the state where both counters 1 and 3 are counting 130, the counted number of the second counter 3 increases according to the same principle as employed in the foregoing example, and a control order is supplied from the coincidence detecting circuit 12 before the compensating circuit 14 puts out a control order. According to this order put out from the coincidence detecting circuit 12, the number counted by the four-bit binary counter 11 is subtracted from the second counter 3 to re-amend the counting by the second counter 3. Thereafter, the microfilm is fed at a slow speed and the counted number counted by the second counter 3 increases by the operation of the reading sensor 5, and the microfilm is stopped at the desired position by the control order from the coincidence detecting circuit 12.

On the other hand, when the frame number of the microfilm desired to be retrieved is smaller than the number of the frame now at the access position, that is, when the number of the counter 1 is smaller than that of the counter 3, and in case that the counted number of the second counter 3 is not less than the compensating number (e.g., 15) of the compensating circuit 14, a control signal of the forward-reverse control circuit 7 effects a subtraction on the second counter 3 by the compensating number and by the re-amendment of the amount of the subtraction the microfilm is brought to the desired position by quite the same principle as in case that the number of the counter 1 is larger than that of counter 3. In the case where the second counter 3 indicates a number not more than the compensating number 15, the counter 3 reads out zero during subtraction of the compensating number. At this time, a control order signal is supplied from the zero detecting circuit 13 and only the number counted by the binary counter 11 and indicating the amount of the subtraction is added to the second counter 3, and the microfilm is fed at a low speed and then stopped by the output order from the coincidence detecting circuit 12 when the counted numbers of the counters 1 and 3 become coincident with each other.

The manner in which the motor 8 is initially strated and then changed in speed will now be described in more detail. There are two modes in the driving operation of the motor 8: (a) high speed start to high speed drive to low speed drive to stop; and (b) low speed start to low speed drive to stop.

In the case where the difference between the contents of the first and second counters 1 and 3 is larger than $\alpha$, the motor 8 is driven under the mode (a). In the embodiment of this invention, when the contents of the second counter 3 become $100 + 15 (\alpha) = 115$, the motor 8 is driven at the high speed, and then it is temporarily stopped when the contents thereof become 130 to coincide with the contents of the first counter 1 (at the time, the present position of the film is 115.) Subsequently, the motor 8 is driven at the low speed after the contents of the second counter 3 are decremented by 15 to be compensated to 15, and then the motor 8 is stopped by using a brake separately located when the contents of the second counter 3 become 130 to second coincide with the contents of the first counter 1.

In the case where the difference between the contents of the first and second counters 1 and 3 is smaller than $\alpha$, the motor 8 is driven under the mode (b). Assume that the contents of the second counter 3, that is, the present position of the film, are 122, the contents of the first counter 1 are 130, and $\alpha$ is 10. Under this condition, the difference between the contents of the counters is smaller than $\alpha$; therefore, the first coincidence occurs before the addition of $\alpha$ to the contents of the second counter 3, so that substantial $\alpha$ will become $\alpha'$ equal 8. When $\alpha=10$ is added to the contents of second counter 3, the contents thereof are over 130 and in the low speed area, and therefore, the motor 8 is still stopped without being driven at the high speed. Subsequently, the motor 8 is driven at the low speed after the contents of the second counter 3 are decremented by $\alpha'$ equal 8 to be compensated to 122, and then when the contents of the second counter 3 become 130 to coincide with the contents of the first counter 1, the motor 8 is stopped as described in the previous case.

The interrelationship of the binary counter 11 and speed control circuit 9 will now be described in more detail.

The binary counter 11 acts as a reversible counter, and the oscillator clock pulse fed through the speed control circuit 9 to the input terminal 11a is added to, or subtracted from, the contents of the binary counter 11 in accordance with the control signal applied from the speed control circuit 9 to the control terminal 11b. The compensating circuit 14 and the zero detecting circuit 15 function to detect the value of the output of the binary counter 11. That is, the compensating circuit 14, when the contents of the binary counter 11 reach the predetermined value $\alpha$, detects this value to develop an $\alpha$ detecting signal; and the zero detecting circuit 15 develops a zero detecting signal when the contents of the binary counter 11 reduce to zero. The speed control circuit 9 provides the clock pulse, which is fed from the oscillator 10, to the terminal 11a of the binary counter 11. The speed control circuit 9 also provides a subtraction control signal to the terminal 11b of the binary counter 11 when the compensating circuit 14 produced an $\alpha$ detecting signal, so that clock pulses applied to the binary counter 11 are subtracted from the contents thereof. Furthermore, the speed control circuit 9 provides a gate close signal to the terminal 11b thereof when the zero detecting circuit 15 produces a zero detecting signal, so that subsequent clock pulses applied to the binary counter 11 are not counted therein. That is, the speed control circuit 9 provides from the terminal 9e a control signal for adding (or subtracting), a control signal for subtracting (or adding), and a gate closing signal, sequentially.

The function of the speed control circuit 9 will now be described in more detail.

The clock pulse, which is fed through the speed control circuit 9 from the oscillator 10 to the switching gate circuit 4, is added or subtracted from the contents of the second counter 3 for amending $\alpha$, and the contents thereof will be changed from the initial value C to $C+\alpha$ or $C-\alpha$, whereby the film frames are forwardly fed upon the addition of a clock pulse, and reversely fed upon the subtraction of a clock pulse.

In the condition where $C+\alpha < R$ or $C-\alpha > R$ (where R is the number of the frame to be retrieved), even if $\alpha$ is added or subtracted from the contents of the second counter 3, the relative magnitude between the contents of the first and second counters 1 and 3 is not changed. On the other hand, in the condition where $C+\alpha \geq R$, or $C-\alpha \leq R$, the adding or subtracting of $\alpha$ changes the relative magnitude therebetween. The change of the relative magnitude can be discriminated by means of a compensating control circuit 18, which is shown in detail in FIG. 5.

According to the operation of FIG. 5, only under the condition where a coincide signal "1" is provided from the coincidence detecting circuit 12 and an $\alpha$ detecting signal is not provided (i.e., "0") from the compensating circuit 14 is a coincide signal "1" presented at the terminal 9, so that the relative magnitude can be discriminated to be in the variable state. While, under other conditions, no signal (i.e., "0") is presented at the terminal $Rg$ so that the relative magnitude can be discriminated to be in the invariable state. In the variable state, therefore, the output of the AND circuit 30 (FIG. 7) becomes "1" to supply a gate signal from the terminal $9g$ to the terminal $7a_2$, (FIG. 2) so as to open the gate of the control circuit 7. In the invariable state, the output of AND circuit 30 becomes "0", and no gate signal is supplied to the terminal $7a_2$, so that the gate thereof is still closed. Furthermore, only the coincide signal 12 applied to terminal $9d$ can be passed to the terminal $q$ (FIGS. 3 and 5).

The operation of the forward-reverse control circuit 7 will now be described in more detail.

Control circuit 7 includes an AND circuit 22 as illustrated in FIG. 2. An AND circuit functions in such a way that the circuit has the output of "1" only if all inputs are provided, and it has the output of "0" if any one of the inputs is not provided. Accordingly, the forward-reverse control circuit 7 has an output of "1" when each of the terminals $7a_1$ and $7a_2$ receives an input signal, and it has an output of "0" for all other conditions. In other words, even if a driving order is provided from the comparator 6 to the control circuit 7, the order will not be fed to the motor 8 except when the relative magnitude of the contents of counters 1 and 3 is in the aforementioned variable state and the gate signal is applied to the terminal $7a_2$ of the control circuit 7.

The operation of FIG. 3 will now be described with reference to FIG. 5 and the waveforms of FIG. 4 and 6.

As indicated in FIG. 5 the input pulse applied to the terminal $9a$ from the oscillator 10 is normally transmitted to the terminal $9c$ except when an $\alpha$ detecting signal is applied from the compensating circuit 14 or a zero detecting signal is applied from the zero detecting circuit 15 through the terminal $9d$ to the inhibit input of an AND circuit 24.

FIG. 4 shows the output waveforms generated at the terminal $9h$ of said control circuit 9. A is the output waveform of the coincide signal fed from the coincidence detecting circuit 12 through the terminal $9d$, B is the output of the flip-flip $FF_1$, C is the output of the flip-flop $FF_2$, D is the output of the timer (clear pulse), E is the output of $AND_1$, F is the output of $AND_2$, and G is the output of $AND_3$.

At the terminal $9h$ there is presented a forward high speed order from $AND_4$ by providing the output of $AND_1$ and the forward input from the terminal $9b$, a reverse high speed order from $AND_5$ by providing the output of $AND_1$ and the reverse input from the terminal $9b$, and a forward low speed order from $AND_7$ by providing the output of $AND_2$ and the forward input from the terminal $9b$. For other conditions, no output is presented at the terminal $9h$. In accordance with these orders provided from the speed control circuit 9 and the driving order provided through the control circuit 7 from the comparator 6, the motor 8 is driven at the forward high speed, reverse high speed, forward low speed, or reverse low speed.

As far as a more detailed description of FIG. 3 is concerned, in accordance with an output of the coincidence detecting circuit 12 (FIG. 1), viz. the output $q$ of the compensating control circuit 18, the affirmative (upper) output B of $FF_1$ (FIG. 3) is determined. The waveform of output $q$ is shown by A, and the output waveform of $FF_1$ is shown by B in FIG. 4. $FF_1$ is inverted by the signal $q$ and is reset by the CLEAR output D of the TIMER. The affirmative output B of $FF_1$ controls $FF_2$, and the output waveform of $FF_2$ is shown by C in FIG. 4. $FF_2$ is likewise reset by the CLEAR output D of the TIMER.

The gate $AND_1$ functions in accordance with the relationship between the inverted (lower) output of $FF_2$ and the affirmative output B of $FF_1$. The output waveform of $AND_1$ is shown by E in FIG. 4.

The gate $AND_2$ functions in accordance with the relationship between the affirmative output C of $FF_2$ and the inverted output of $FF_1$. The output waveform of $AND_2$ is shown by F in FIG. 4.

The gate $AND_3$ functions in accordance with the relationship between the affirmative output C of $FF_2$ and the output B of $FF_1$. The output waveform of $AND_3$ is shown by G in FIG. 4.

The TIMER receives the output G of $AND_3$ and produces the CLEAR pulse shown by waveform D in FIG. 4.

As shown in FIG. 3, the outputs of $AND_1$, $AND_2$ and $AND_3$ are arranged such that the output of $AND_4$ instructs Motor 8 to rotate in forward direction at a high speed; $AND_5$ in reverse low speed; $AND_6$ in reverse high speed; and $AND_7$ in the forward direction at a low speed.

From the foregoing, it is seen that the $9h$ output of speed control circuit 9 control the rotational direction and the speed of the Motor 8 (FIG. 1).

Turning now to the other control of Motor 8, i.e., the output $7b_1$ of control circuit 7, this output controls the driving duration of the motor 8 and thereby the microfilm. When there is no output on $7b_1$ from the control circuit 7, the Motor 8 does not rotate.

FIG. 5 shows that the control circuit 18 includes a TIMING GENERATOR, a STARTING FLIPFLOP (FF), an AMENDING FF, a DETECTING $FF_1$, a DETECTING $FF_2$, four AND Circuits, and four NOT Circuits. The TIMING GENERATOR may include, for example, a counter which provides inputs to the STARTING FF, the DETECTING $FF_2$, and the AMENDING FF at predetermined times based on the clock pulses produced by oscillator 10.

In FIG. 5, the oscillator input pulses on $9a$ are fed to $9c$ via the AND circuit 24. When there are no inputs present on line $9d$, the output of OR circuit is "0" which is then inverted to "1" by the NOT circuit 33; thus, $AND_{24}$ transmits the oscillator 10 pulses since $\alpha$ or zero detecting signals are not present on line $9d$.

When α or zero detecting signals appear at line 9d, the output of $OR_{35}$ becomes "1" which is then inverted by $NOT_{33}$, viz. the output of oscillator 10 is not transmitted through $AND_{24}$ to line 9c.

Depending upon whether a forward or reverse instruction signal appears on line 9b, a gate instruction for addition or substraction, respectively, is applied to 4b of switching gate circuit 4 (FIG. 1) via the DETECTING $FF_2$ in the compensating control circuit 18 of the speed control 9 and via line 9f. The instructions on line 9b are applied to the terminals G1 and G2 of DETECTING $FF_2$. According to the timing of the timing pulse which is applied to the terminal CLK of DETECTING $FF_2$ by the TIMING GENERATOR, gate instructions for addition or substraction are obtained at the affirmative output 9f of DETECTING $FF_2$.

Gate instructions from line 9e are likewise processed under controls of the TIMING GENERATOR, STARTING FF, AMENDING FF, DETECTING $FF_2$, and $AND_{31}$, as described in more detail below.

The signal on line 9d in FIG. 5 includes outputs from circuits 12, 14 and 15 of FIG. 1. When all three of these outputs exist, no pulse is transmitted through $AND_{24}$ and line 9c to the switching gate circuit 4. Also when there are outputs from both circuits 12 and 14, $AND_{30}$ is inhibited so that there is no output on line 9g. However, when there is an output from 12 and no output from 14, then $AND_{30}$ is enabled to provide an output on line 9g; in all other cases, there is no output on line 9g. Whether or not the coincidence pulse output of circuit 12 appears on the output q of $AND_{32}$ is under the control of the TIMING GENERATOR and STARTING FF, as described in more detail below.

First, the output of $AND_{30}$ is under the control of the outputs of $NOT_{34}$ and DETECTING $FF_1$. The output of $AND_{30}$ is identical to the output 9g of FIG. 3. That is, when the output of DETECTING $FF_1$ is "1", and the α detecting output from circuit 14 is "1", the output 9g of AND 30 becomes "0". When the coincidence output of DETECTING $FF_1$ is "1" and the α detecting output from circuit 14 is "0", the output 9g of $AND_{30}$ becomes "1". Only in a latter case is the coincidence output transmitted to the input $7a_2$ of the control circuit 7 (FIGS. 1 and 2), whereby the driving of the microfilm by motor 8 is controlled.

The TIMING GENERATOR of FIG. 5 has a repetitive cycle containing four timing pulses T1, T2, T3 and T4 as shown in FIG. 6. Pulse T1 is applied to the STARTING FF, pulse T2 to the AMENDING FF, pulse T3 to the DETECTING $FF_2$, and pulse T4 to the DETECTING $FF_1$.

The STARTING FF functions in accordance with every first pulse T1 from the TIMING GENERATOR. More specifically, when the STARTING FF receives a first pulse from the TIMING GENERATOR, the output of the STARTING FF is inverted, viz. assuming that the initial state of the output thereof is "0", then the output thereof changes to "1", and vice versa. The output terminal of the STARTING FF is connected to the gate G of AMENDING FF and one of the inputs of $AND_{32}$. Further, AMENDING FF receives a second pulse T2 generated by the TIMING GENERATOR, and the output of AMENDING FF is connected to one of the inputs of $AND_{31}$. To the other input of $AND_{31}$ is applied the output of DETECTING $FF_2$ which operates in accordance with the signals on 9b and the third pulse T3 from TIMING GENERATOR. Accordingly, the signal on 9e is produced by the AND relation of the above two signals. The above operation is clear from the waveforms shown in FIG. 6.

While the invention has been described in detail and with reference to specific embodiments thereof, it will be apparent to one skilled in the art that various changes and modifications can be made therein without departing from the spirit and scope thereof.

We claim:

1. A system for positioning at an access position a desired frame of a roll of film adapted to be driven in either a forward or backward direction at either a high or low speed by a two-speed reversible motor, and comprising:
   a. first counter means for storing the frame number of the desired frame to be positioned at the access position;
   b. second counter means for counting and storing the number of the actual frame present at said access position;
   c. comparator means coupled to said first and second counter means for producing a comparator output signal representative of the relative values of the numbers stored in said first and second counter means;
   d. compensating circuit means for storing a predetermined number α corresponding to the number of frames to be driven at the low speed prior to the arrival of said desired frame at said access position;
   e. means responsive to said comparator output signal and coupled to said compensating circuit means for, prior to movement of the film, algebraically adding to the count of said second counter means said predetermined number in a first sense depending upon the relative magnitudes of the counts stored in said first and second counter means;
   f. coincidence-detecting means responsive to a first comparator output signal representative of an equality of counts in said first and second counter means, as the film is driven at a high speed by the motor, for producing a first coincidence signal for changing the speed of said motor and said film from the high speed to the low speed;
   g. said adding means being responsive to said first coincidence signal for algebraically adding said predetermined number α in the opposite sense to the contents of said second counter means; and
   h. said coincidence-detecting means being responsive to a subsequent comparator output signal representative of an equality of counts in said first and second counter means for stopping said motor and film, whereby said desired frame is driven toward said access position at the high speed until said predetermined number of frames before said access position, and whereby said desired frame is driven to said access position at said low speed for said predetermined number of frames.

2. The system as defined in claim 1 wherein said second counter means comprises an addition input terminal and a subtraction input terminal; and wherein said adding means comprises switch means connected between said input terminals and a source of pulses for incrementing or decrementing the contents of said second counter, and third counter means for controlling said switch means for accomplishing the algebraic additions in said first and opposite senses.

3. A method for positioning at an access position a desired frame of a roll of film adapted to be driven in either a forward or backward direction at either a high or low speed by a two-speed reversible motor, and comprising:
a. storing in a first counter the frame number of the desired frame to be positioned at the access position;
b. storing in a second counter the number of the actual frame present at said access position;
c. comparing the numbers stored in said first and second counters and producing an output signal representative of the relative values of the stored numbers;
d. storing a predetermined number corresponding to the number of frames to be driven at the low speed prior to the arrival of said desired frame at said access position;
e. prior to the movement of the film, algebraically adding to the number in said second counter said predetermined number in a first sense depending upon the relative magnitudes of the numbers stored in said first and second counters;
f. then driving the film at the high speed and changing the number in said second counter in accordance with the number of frames passing through the access position;
g. changing the speed of said motor and said film from the high speed to the low speed when the numbers in the counters become equal for the first time;
h. then algebraically adding said predetermined number to the contents of said second counter in the opposite sense; and
i. then driving the film at the low speed for said predetermined number of frames until the numbers in the counters are equal for a second time, and then stopping the motor and film so that said desired frame is positioned at said access position.

* * * * *